US008284422B2

(12) United States Patent  
Yabuki et al.

(10) Patent No.: US 8,284,422 B2  
(45) Date of Patent: Oct. 9, 2012

(54) FACSIMILE APPARATUS, AND RECEIVED-DATA PROCESSING METHOD FOR USE IN SAID FACSIMILE APPARATUS

(75) Inventors: Shinichi Yabuki, Toyokawa (JP); Takashi Honda, Toyokawa (JP); Masazumi Ito, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1158 days.

(21) Appl. No.: 11/212,773

(22) Filed: Aug. 29, 2005

(65) Prior Publication Data

US 2006/0181732 A1 Aug. 17, 2006

(30) Foreign Application Priority Data

Feb. 16, 2005 (JP) .................................. 2005-39260

(51) Int. Cl.  
*G06F 3/12* (2006.01)

(52) U.S. Cl. ...... 358/1.15; 358/1.13; 358/402; 358/404; 358/426.05; 358/442; 358/444; 358/468; 358/523; 358/524

(58) Field of Classification Search .................. 358/1.15, 358/444, 442, 468, 402, 404, 426.05, 523, 358/524, 1.13  
See application file for complete search history.

(56) References Cited

U.S. PATENT DOCUMENTS

| | | | | |
|---|---|---|---|---|
| 5,386,303 A | * | 1/1995 | Kihara | 358/453 |
| 5,719,688 A | * | 2/1998 | Kagami | 358/468 |
| 5,963,340 A | * | 10/1999 | Kim | 358/440 |
| 6,509,980 B1 | * | 1/2003 | Murata | 358/444 |
| 6,594,351 B1 | * | 7/2003 | Bhogal et al. | 379/100.01 |
| 2002/0051220 A1 | * | 5/2002 | Tanaka et al. | 358/400 |
| 2002/0176108 A1 | * | 11/2002 | Jeon | 358/1.15 |
| 2005/0080932 A1 | * | 4/2005 | Liu | 709/249 |
| 2006/0262356 A1 | * | 11/2006 | Honda et al. | 358/400 |
| 2007/0013562 A1 | * | 1/2007 | Nagasawa | 341/50 |
| 2007/0242304 A1 | * | 10/2007 | Asano | 358/1.16 |

FOREIGN PATENT DOCUMENTS

| | | |
|---|---|---|
| JP | 5336320 | 12/1993 |
| JP | 7023166 | 1/1995 |
| JP | 10136190 A * | 5/1998 |
| JP | 2003234856 A * | 8/2003 |

* cited by examiner

*Primary Examiner* — Jacky X Zheng  
(74) *Attorney, Agent, or Firm* — Morriso & Foerster LLP

(57) ABSTRACT

A facsimile apparatus includes one or a plurality of connecting portions configured to connect an external storage, a communication portion having a plurality of different facsimile lines, a line specifying portion configured to specify a facsimile line which received data, a detecting portion configured to detect that an external storage is connected to the connecting portion, and a control portion configured to store the data received by a predetermined facsimile line in an external storage connected to the connecting portion in cases where a facsimile line specified by the line specifying portion is a predetermined line and a connection of the external storage is detected by the detecting portion.

12 Claims, 12 Drawing Sheets

FACSIMILE APPARATUS, AND RECEIVED-DATA PROCESSING METHOD FOR USE IN SAID FACSIMILE APPARATUS

This application claims priority under 35 U.S.C. §119 to Japanese Patent Application No. 2005-39260 filed on Feb. 16, 2005, the entire disclosure of which is incorporated herein by reference in its entireties.

BACKGROUND OF THE INVENTION

1. Field of the Invention

The present invention relates to a facsimile apparatus equipped with a plurality of different facsimile lines and a received-data processing method for use in this facsimile apparatus.

2. Description of the Related Art

The following description sets forth the inventor's knowledge of related art and problems therein and should not be construed as an admission of knowledge in the prior art.

In cases where one facsimile apparatus is shared among a plurality of divisions or sections, each division or section sometimes employs its exclusive facsimile line for transmitting and receiving data.

In this case, however, when the received data is printed out as it is, any users belonging to other divisions or sections can also recognize the data. This causes security problems.

Furthermore, although it may be possible to secure the security by using a facsimile apparatus having a confidential receiving function, it is not realistic because it is difficult for the user to have all data transmitted as confidential.

Japanese Unexamined Laid-open Patent Publication No. H7-23166 proposes a facsimile apparatus in which user specifying information stored in a memory card is read and the data stored in the memory card is outputted in accordance with the results.

Furthermore, Japanese Unexamined Laid-open Patent Publication No. H5-336320 proposes a facsimile apparatus. In this facsimile apparatus, in cases where a detachable external storage is removed, the transmitting operation and the receiving operation are suspended and the status is displayed; in cases where the external storage is removed, the read image information is directly transmitted without storing in the detachable external storage; and in cases where the external storage is removed and then attached again with the received image information or transmitted image information stored, the image information is read and then either outputting the image information as a hard copy or transmitting the image information is executed.

However, in each of the aforementioned patent documents, it is neither disclosed nor indicated that, in cases where one facsimile apparatus having a plurality of facsimile lines is shared with different divisions or sections, security is secured such that received data cannot been seen by users belonging to other divisions or sections.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a facsimile apparatus capable of securing security of received data in cases where one facsimile apparatus having a plurality of facsimile lines is shared with different divisions or sections, etc.

Among other potential advantages, some embodiments can provide a received-data processing method for use in the aforementioned facsimile apparatus.

According to a first aspect of the preferred embodiment of the present invention, a facsimile apparatus, comprises:

one or a plurality of connecting portions configured to connect an external storage;

a communication portion having a plurality of different facsimile lines;

a line specifying portion configured to specify a facsimile line which received data;

a detecting portion configured to detect that an external storage is connected to the connecting portion; and a controller configured to store the data received by a predetermined facsimile line in an external storage connected to the connecting portion in cases where a facsimile line specified by the line specifying portion is a predetermined line and a connection of the external storage is detected by the detecting portion.

According to a second aspect of the preferred embodiment of the present invention, a facsimile apparatus, comprises:

a plurality of connecting portions configured to connect a plurality of external storages;

a communication portion having a plurality of different facsimile lines;

a line specifying portion configured to specify a facsimile line which received data;

a detecting portion configured to detect that each of the external storages is connected to each of the connecting portions;

a storing portion configured to store correlated information on relation between each of the lines and each of the external storages; and a controller configured to store the received data in the external storage correlated with the received data, in cases where connection of the external storage correlated with the facsimile line which received data by the line specifying portion based on the correlated information was detected by the detecting portion.

According to a third aspect of the preferred embodiment of the present invention, a received-data processing method for use in a facsimile apparatus, the method comprises:

a step of specifying which facsimile line among a plurality of different facsimile lines received data;

a step of detecting that an external storage is connected to one or a plurality of connecting portions; and a control step of storing the data received by the predetermined facsimile line in the external storage connected in cases where the specified facsimile line is a predetermined line and connection of the external storage to the connecting portion is detected.

According to a fourth aspect of the preferred embodiment of the present invention, a received-data processing method for use in a facsimile apparatus, the method comprises:

a step of specifying which facsimile line among a plurality of different facsimile lines received data;

a step of detecting that a plurality of external storages are connected to a plurality of connecting portions respectively;

a step of correlating each of the facsimile lines with each of the external storages based on correlated information; and a step of storing the received data in the correlated external storage in cases where connection of the external storage correlated with the facsimile line which received the data is detected at the detecting step.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

[MFP Entire Structure]

Figure 1:
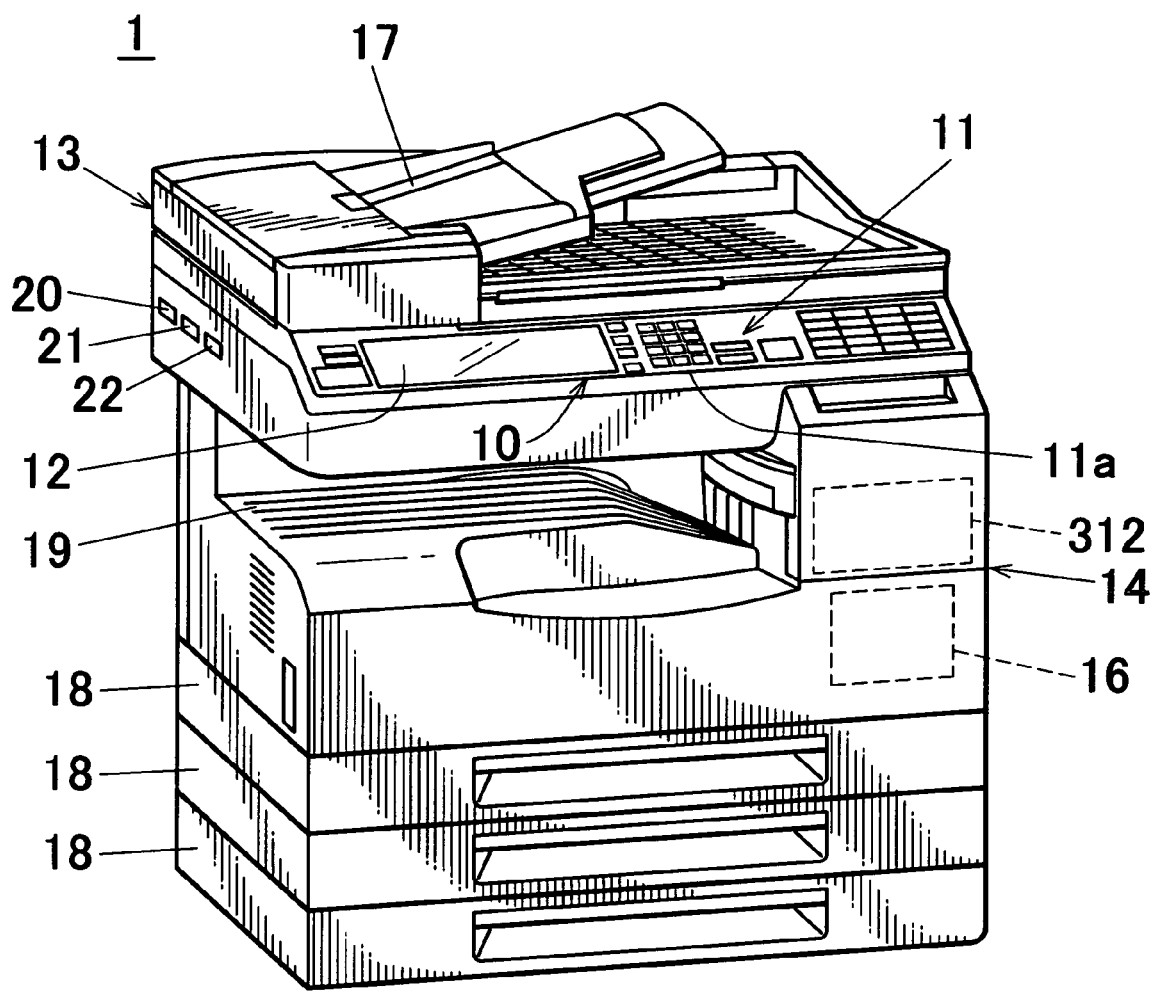
FIG. 1 is a perspective view showing a MFP with a job execution equipment according to an embodiment of the present invention.

FIG. 1 is a perspective view showing a MFP as an image forming apparatus to which an information processing apparatus according to an embodiment of the present invention is applied.

Figure 2:
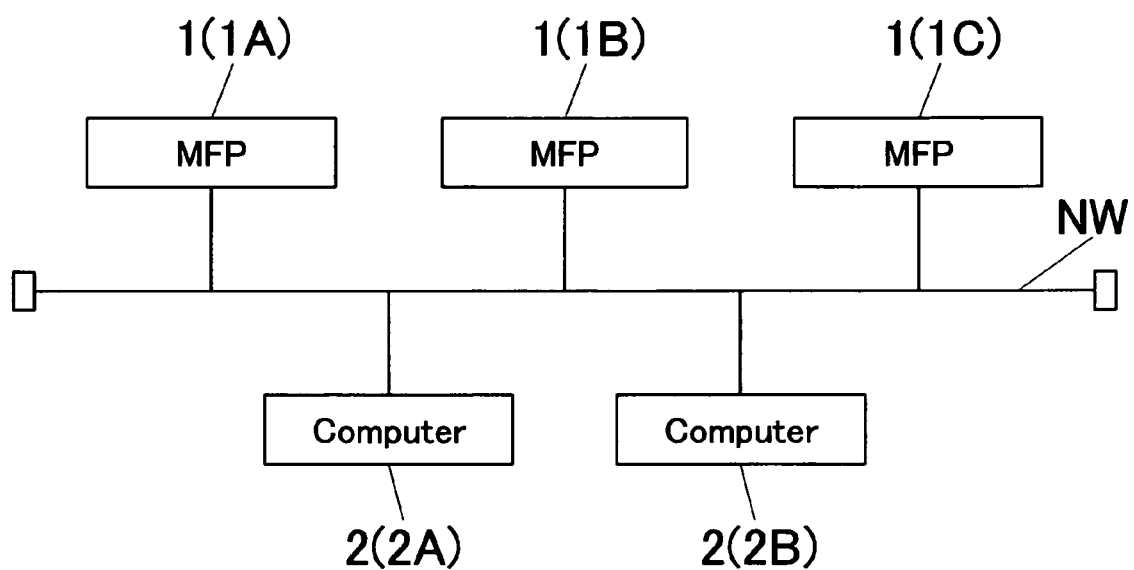
FIG. 2 is a block diagram showing a network environment of the MFP.

In FIG. 1, the MFP 1 is a digital complex apparatus having a copy function, a print function, a facsimile function, a scanner function, etc., which can transmit and receive data between the apparatus and user terminals, etc., via the network NW (see FIG. 2). In the following explanation, a facsimile may also be referred to as a "FAX."

This MFP is provided with a total of three, i.e., a first to third, slots 20, 21, 22 as connecting means for detachably connecting external devices of USB (Universal Serial Bus) standard. By inserting external devices each having a USB interface, e.g., USB memories 320, 321 and 322 (see FIG. 3) as external storages, into the slots, data transmitting and receiving can be performed between the external device and the MFP 1. Hereinafter, the ports 20, 21 and 22 are referred to as USB ports or USB connectors.

The MFP 1 is equipped with an operation panel 10. This operation panel 10 has a plurality of keys 11a, an operation portion 11 which accepts entries of data, such as various kinds of instructions, characters and numbers, via a use's operation of the keys 11a, and a display 12 made of, e.g., a liquid crystal for displaying instruction menus for a user or information about the obtained image.

Furthermore, the MFP1 is equipped with a scanner portion 13 which reads an original optically and obtains its image data, and a printer portion 14 which prints an image on a recording sheet based on the image data.

On the upper surface of the main body of the MFP 1, a feeder portion 17 for sending an original to the scanner portion 13 is provided. At the lower portion of the main body, a paper feeding portion 18 which feeds a recording sheet to the printer portion 14 is provided. At the central portion, a tray 19 on which the recording sheet on which an image was printed by the printer portion 14 is discharged is provided. Furthermore, in the main body of the MFP 1, a communication portion 16 for transmitting and receiving image data, etc., between the MFP 1 and external apparatuses via a network NW, and a storage portion 312 for storing image data, etc., are provided.

The MFP 1 has a network interface, and the communication portion 16 is connected to a network NW via the network interface so that various data can be exchanged between the MFP and external apparatuses.

The aforementioned display 12 is used to display information including a list of destinations of data transmission. Moreover, the operation portion 11 is used to enter various inputs including a selection of destination by a user. They function as a principal part of a user interface.

The aforementioned scanner portion 13 photoelectrically reads image information, such as photographs, characters and pictures, from an original to obtain the image data. The obtained image data (concentration data) is converted into digital data in an image processing portion (not illustrated) and subjected to various well-known image processing, and then transferred to the printer portion 14 to print the image or to the communication portion 16 to transmit the data, or stored in a storage portion 23 for future use.

The printer portion 14 is used to print an image on a recording sheet based on the image data obtained by the scanner portion 13, the image data received from the external apparatus via the communication portion 16, or the image data stored in the storage portion 23.

The communication portion 16 performs transmitting and receiving of FAX data via public telephone lines, and also performs transmitting and receiving of data via e-mails between the MFP and the external apparatuses connected to a network NW via the network such as a LAN or the Internet.

Thus, the MFP 1 has not only a function as a FAX apparatus which performs a normal FAX communication but also a function as an e-mail sending/receiving terminal. Accordingly, the MFP 1 can send and receive various image data by attaching the image date file to an e-mail. Please note that the network communication by the MFP 1 can be performed via a wired network or a radio network. The illustrated embodiment shows a wired communication network.

[Outline of Network]

FIG. 2 shows an example of a network system for explaining an embodiment of the present invention.

As shown in FIG. 2, the network system is constituted by personal computers (hereinafter referred to as "PC(s)") 2 (2A, AB, . . . ) as a plurality of external apparatuses (terminals) which require printing processing as a job and a plurality of MFPs 1 (1A, 1B, 1C . . . ) for performing the job. In this embodiment, it is assumed that each MFP 1 has a multi-job function.

The aforementioned multi-job function includes, in an image forming apparatus such as a digital copier and a printer which performs image forming using digitized image data, a function of image forming by subjecting image data read by an image reader, etc., to digital processing and a function of image forming using image data transmitted from an external terminal such as PC 2 connected to the image forming apparatus. Furthermore, a function of obtaining image data while forming an image is also the multi-job function.

In an image forming apparatus equipped with a multi-job function, image forming using image data obtained from a set of originals read by an image reader or image forming using image data transmitted from a PC is treated as one job respectively, and image forming is performed one by one per job.

In detail, image data obtained by reading an original or image data transmitted from a PC is stored in an image memory in a state in which the image data is correlated with the corresponding job identifier (hereinafter "Job ID"), while the Job ID is registered in a predetermined management table in the order in which each job was issued to the image forming apparatus. And image forming is performed in the order of the job ID registered in the table.

[Electric Structure of MFP 1]

Figure 3:
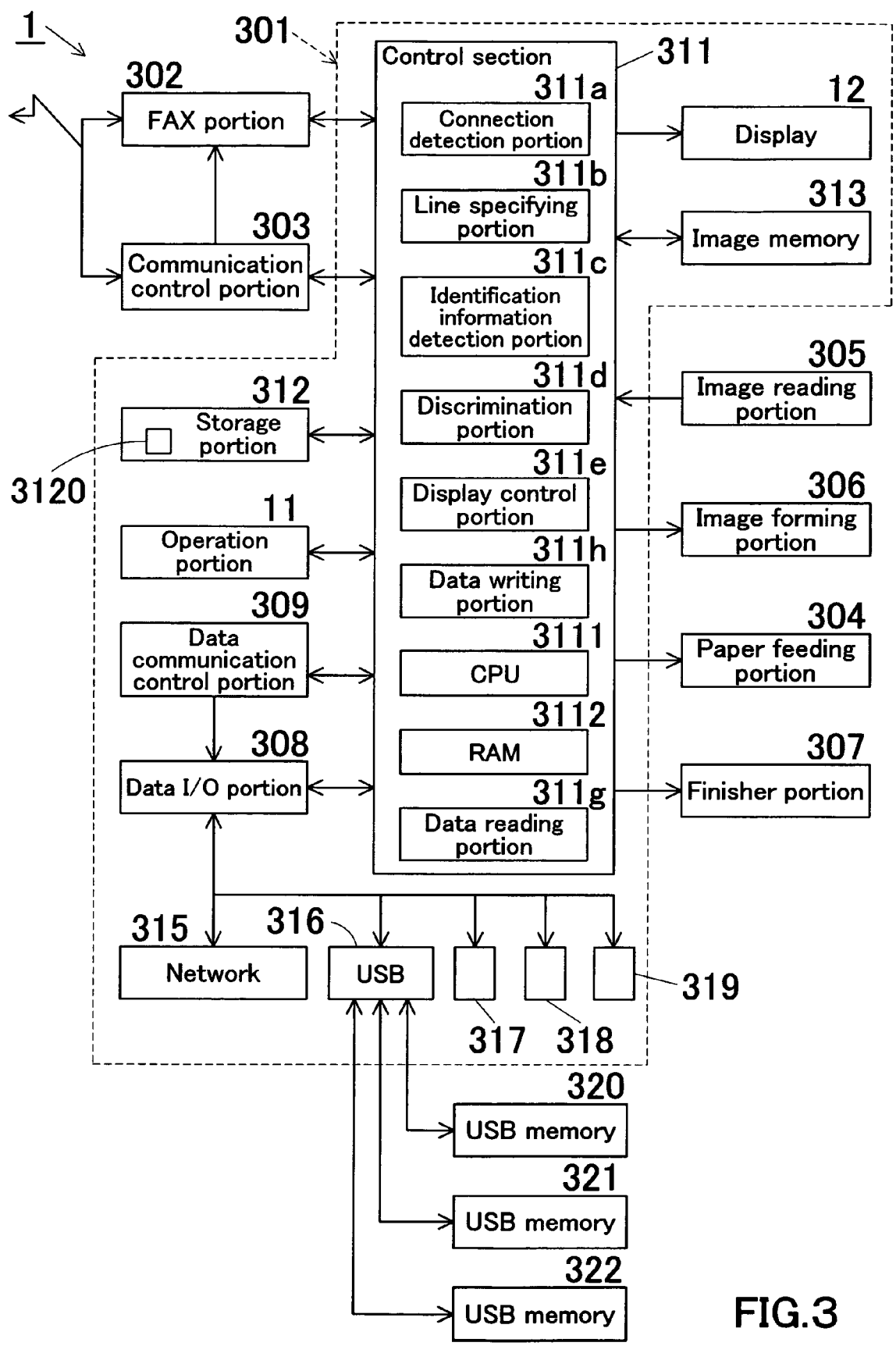
FIG. 3 is a block diagram showing an electric structure of the MFP.

FIG. 3 is a block diagram showing the electric structure of the MFP 1.

As shown in FIG. 3, this MFP 1 is provided with an information processing portion 301, a FAX portion 302, a communication control portion 303, a paper feeding portion 304, an image reading portion 305 constituting the scanner portion 13, an image forming portion 306 constituting the printer portion 14, and a finisher portion 307.

The FAX portion 302 and the communication control portion 303 constitute the aforementioned communication portion 16. In this embodiment, the MFP 1 is equipped with three FAX lines A to C, and can transmit/receive FAX data including a confidential FAX via each line.

The information processing portion 301 is an example of an information processing means, and has a data I/O portion 308, a data communication control portion 309, an operation portion 11, a control section 311, a storage portion 312, an image memory 313, and a display 12. In the information processing portion 301, deleting or outputting of a job stored in the image memory 313 is controlled for example.

The control section 311 has a CPU 3111 and a RAM 3112, etc. Connected to this control section 311 is the data I/O portion 308 to output/input a job.

This control section 311 controls the entire operations of the MFP 1, e.g., the print operation, the copy operation, the scanning operation, the FAX sending operation, the e-mail sending operation and the FTP (File Transfer Protocol) sending operation, and also has the following functions.

That is, the control section 311 also functions as a detecting portion 311a which detects whether a USB memory 320 (321) (322) is connected to the USB port 20 (21) (22).

It also functions as a line specifying portion 311b which discriminates which facsimile line A to C received the transmitted FAX data.

Furthermore, the control section 311 also detects a pin number as identification information attached to confidential FAX data when the confidential FAX is received, detects identification information ID written in a USB memory 320 to 322 connected to a USB port 20 to 22, or functions as an identification information detecting portion 331c which detects a pin number as identification information inputted by a user to print FAX data stored in a USB memory 320 to 322.

Furthermore, the control section 311 discriminates whether the pin number of the confidential FAX data detected by the identification information detecting portion 311c and the identification information of the USB memory conform, discriminates whether the pin number inputted by a user and the identification information of a USB memory conform, discriminates whether a FAX received by the FAX portion 302 is a confidential FAX or a normal FAX, and functions as a discrimination portion 311d which discriminates another matters.

Furthermore, the control section 311 functions as a display control portion 311e which displays predetermined messages on the display 12 of the operation panel 10.

The concrete operations of each function in the above-identified control section 311 will be detailed later.

The data I/O portion 308 is provided with a plurality of terminals, including LAN (Local Aria Network) terminals 315 for TCP/IP based networks, USB terminals 316, centronics terminals 317, serial interface terminals 318, and/or interface (I/F) terminals for JTAG terminals 319.

The data I/O portion 308 is configured such that the control section 311 can read, write or delete data when the network terminal 315, the USB terminal 316, the centronics terminal 317, the serial interface terminal 318 or the UTAG terminal 319 is connected by a corresponding device.

The storage portion 312 is configured with, for example, a non-volatile memory such as a hard disk, and has the exclusive storage region (box) 3120 for storing image data, etc. Moreover, in the storage portion 312, correlated information showing a relation between the FAX line A to C and the USB memory 320 to 322 connected to the USB port 20 to 22 is stored in advance, which will be detailed layer.

Furthermore, in the image memory 313, a copy can be performed between memories.

The aforementioned CPU 3111 is configured to make the control section 3111 operate so as to demonstrate the aforementioned controls and functions. When the CPU 311 executes the program stored in a program storing portion (not shown), the control section 311 operates. The RAM 3112 serves as a working area when the CPU 3111 performs a program.

In this embodiment, as mentioned above, there are a plurality of slots as USB terminals 316 so that USB memories 320, 321 and 322 can be connected thereto. Furthermore, the control section 311 can simultaneously perform writing of information to these USB memories 320, 321 and 322 and reading of stored information from these USB memories 320, 321 and 322. The reading of stored information is performed by the data reading portion 311g of the control section 311, and the writing of information is performed by the data writing portion 311h.

[Operation Panel]

Figure 4:
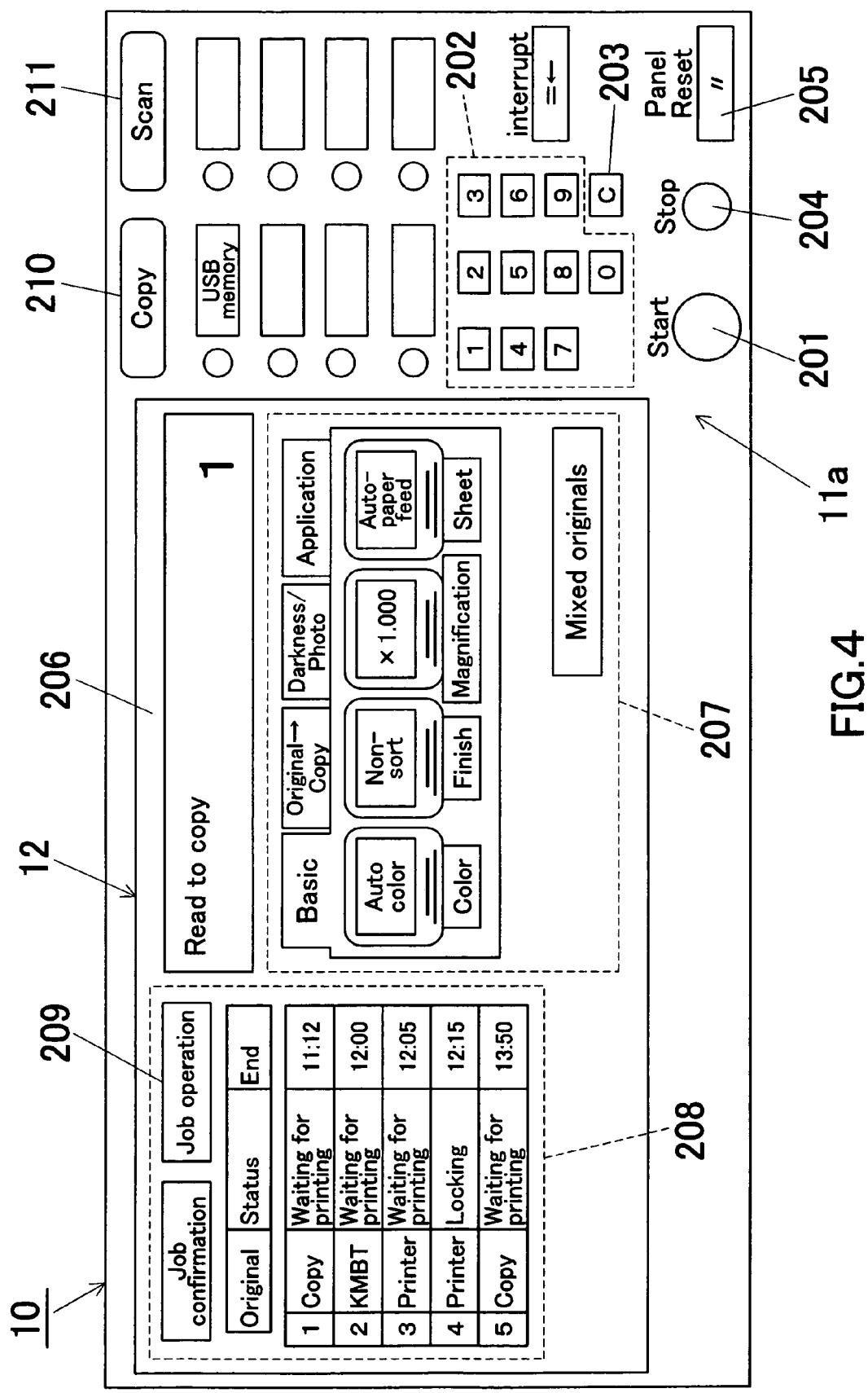
FIG. 4 is an explanatory view showing a display screen of an operation panel of the MFP.

FIG. 4 is a plan view showing the structure of the operation panel 10 of the MFP 1.

In FIG. 4, the start key 201 is used to initiate an operation of, e.g., a copy, print, FAX transmission, E-mail, or FTP transmission. The ten keys 202 are used to input numeric values, such as the number of copies to be made. The clear key 203 is used to clear the inputted numeric value and erase image data stored in the image storage portion.

The stop key 204 is used to instruct a termination of copying/scanning operation. The panel reset key 205 is used to cancel the set operation mode and job.

Furthermore, the display 12 displays, for example, various modes and an alarm for notifying that a USB memory 320, 321 or 322 is left unplugged, and is provided with a touch panel 206. With this touch panel 206, a user can perform various settings according to the contents shown on the display 12. For example, in cases where a setting screen of a user ID which is a user's identification information is displayed on the display 12, the user can set up the user ID using the touch button displayed on the display 12 or various keys of the operation portion 11.

In the setting screen area 207 of the touch panel 206, in general, buttons for performing fundamental/advanced settings to initiate copying operations or facsimile transmitting operations are provided. When each button is touched, a hierarchy screen for performing the detailed setting will be displayed.

The job information screen area 208 in the touch panel 206 displays the job information supplied to the MFP 1 at the time. The job information is arranged in order of jobs to be executed. In cases where an operation of deleting or changing a specific job, the job operation button 209 is touched, and then the job number button to be operated is touched. The aforementioned operations cause displaying of a job operation screen, enabling an operation to a specific job.

The copy key 210 and the scanning key 211 are selection keys for setting whether the MFP 1 is operated by either a copy mode or a scanner mode.

In cases where the copy key 210 is pressed, the MFP 1 becomes available as a copy machine. In this state, a scanner operation and a facsimile send action cannot be performed.

At this time, in the setting screen area 207 of the touch panel 206, a copy mode for performing various settings to the copy operation is displayed. After the completion of the settings, when an original is set and the start key 201 is pressed, a copy operation is initiated. In cases where the scanning key 211 is pressed, the MFP1 is served as a scanner and a FAX machine. In this state, a copy operation cannot be performed.

At this time, an operation mode for performing various settings to a scanning operation (including a transmission of the scanned original)/a facsimile transmission operation is displayed in the setting screen area 207 of the touch panel 206. After the completion of various settings, when an original is set and the start key 201 is pressed, a scanning operation/facsimile transmitting operation is initiated.

In this embodiment, the copy key 210 and the scanning key 211 can be exclusively operated, and if one of them is selected, another will become in a non-selected state automatically.

In cases where a print is performed from the PC 2 using the MFP 1, a printer control driver software is installed in the PC 2, and various printing settings are performed on the driver screen. Accordingly, neither print setting screen nor print change key is required on the operation panel 10 of the MFP 1.

[Operation Panel (File Selection in a USB Memory)]

Figure 5:
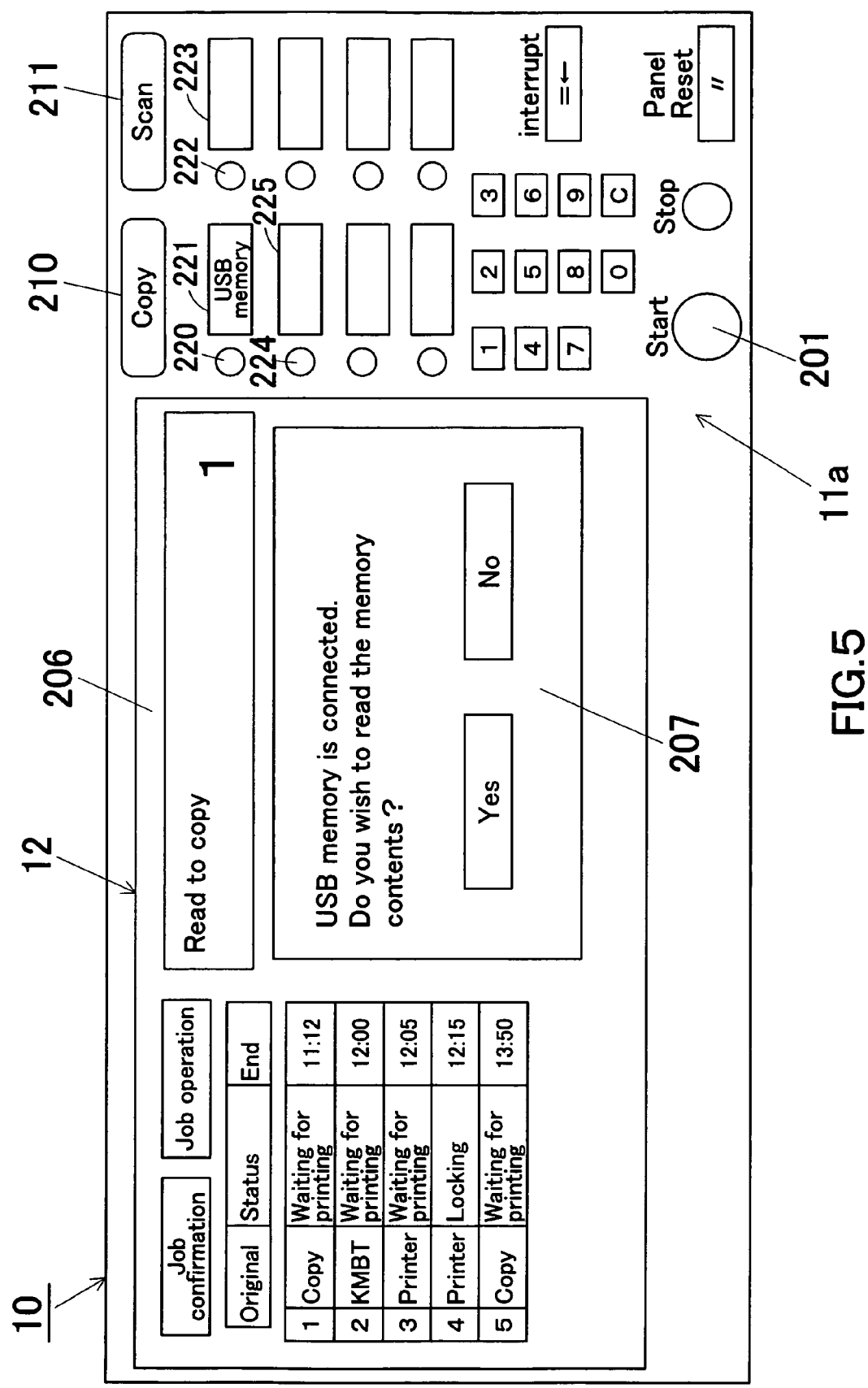
FIG. 5 is a user confirmation screen displayed when stored information on an external storage is read.

FIG. 5 shows a user confirmation screen of the MFP 1 in cases where the MFP 1 reads image data from the USB memory 320, 321 or 322.

In FIG. 5, when the USB memory reading key (may also be referred to as "USB choice key") 221 is pressed with a USB memory 320 (321)(322) connected to the USB port 20 of the MFP 1(21)(22), the setting screen area 207 shifts to a hierarchy of a USB memory reading confirmation screen.

In this screen, in cases where the selection "Yes" for reading the contents of the USB memory 320 (321) (322) is pressed (touched), the MFP 1 accesses the USB memory 320 (321) (322) and performs processing for reading the contents of the USB memory 320 (321) (322).

The reference numerals 223 and 225 denote a reading key which becomes available when another USB memory is inserted in another USB port, respectively, and the reference numerals 220, 222 and 224 denote light emitting diodes (LEDs) provided corresponding to the reading keys 221, 223 and 225, respectively.

Figure 6:
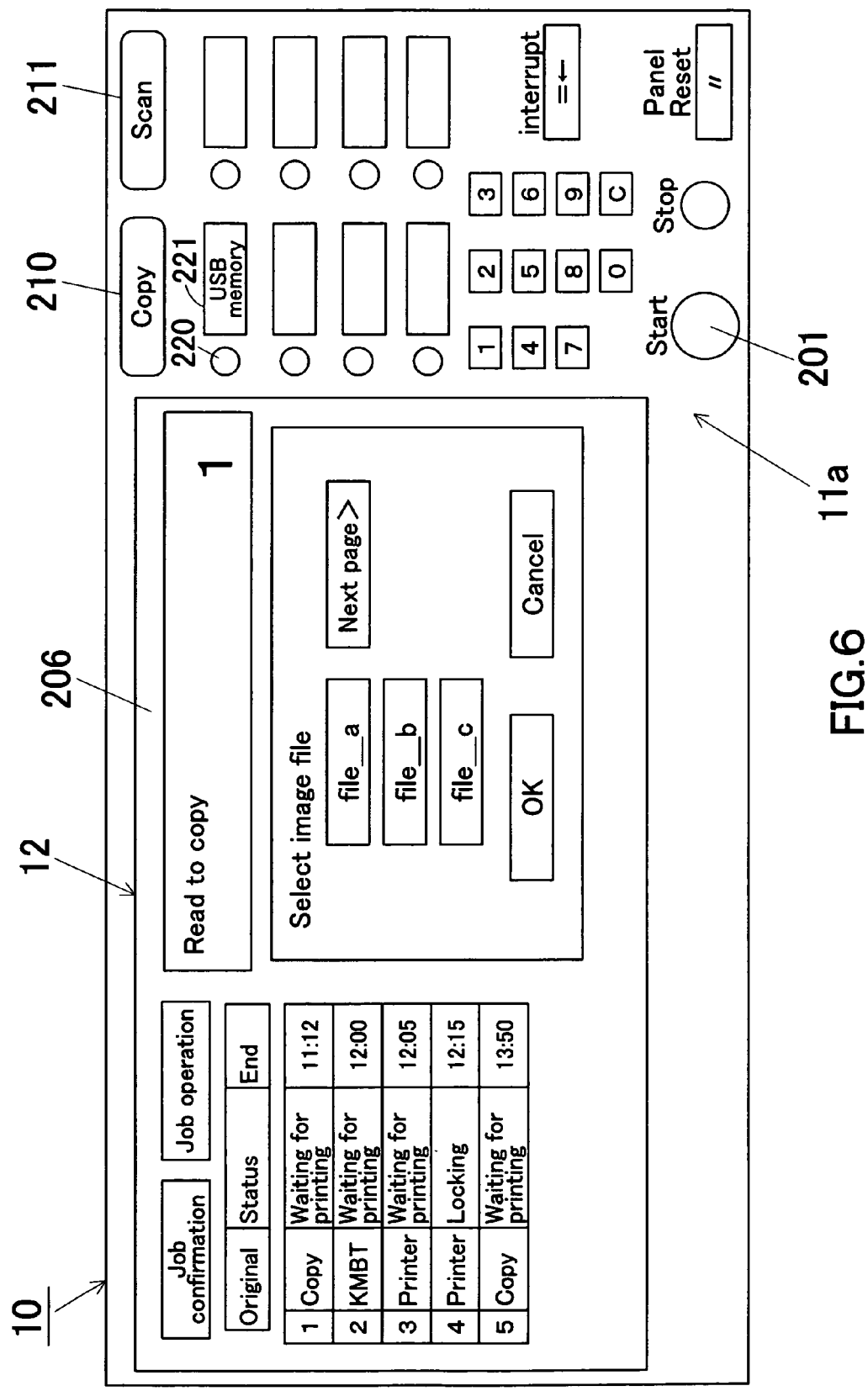
FIG. 6 is a screen displayed when a user chooses storage information on an external storage.

In cases where stored information (for example, image data) exists in the USB memory 320 (321) (322), as shown in FIG. 6, a panel display shows the list of image data in the memory, and enables a user to select the desired image data. If the number of data existing in the memory exceeds this hierarchy screen display, the remaining data will be displayed in accordance with the pressing of the "next page" key.

When "OK" is touched on this screen, the MFP 1 starts the processing for reading the specified file. When the data is read normally, the LED 220 corresponding to the USB memory reading key 221 will be turned on to notify a user that the image data was read from the USB memory 320 (321) (322).

When the start key 201 is pressed after the selection of the desired image data by a user, in cases where a copy function (copy key 210) is selected, a control for scanning the original on the original stand by an image reading portion is not carried out, but image data selected by a user is read from the USB memory 320 (321) (322) and outputted to an output portion.

In the same manner, in cases where the scanning key 211 is selected, a control for scanning the original on the original stand by the image reading portion is not carried out, but image data selected by a user is read from the USB memory 320 (321) (322), and a FAX transmission of the image to the set destination is performed, or a file transmission is performed by an E-mail, a FTP transmission, etc.

In FIG. 6, when "cancel" is touched, reading of the specified file is not performed, but the screen returns to the former hierarchy screen as shown in FIG. 5.

In FIG. 5, when "No" for not reading the contents of the USB memory 320 (321) (322) is touched, access to the USB memory 320 (321)(322) is not performed and the LED 220 corresponding to the USB memory reading key 221 will be turned off. At this time, when the start key 201 in the copy function is pressed, like the usual copy, a scanning control of an original is performed to read an image, and the read image as shown on the screen is outputted to an output portion.

[FAX Receiving Processing]

Figure 7:
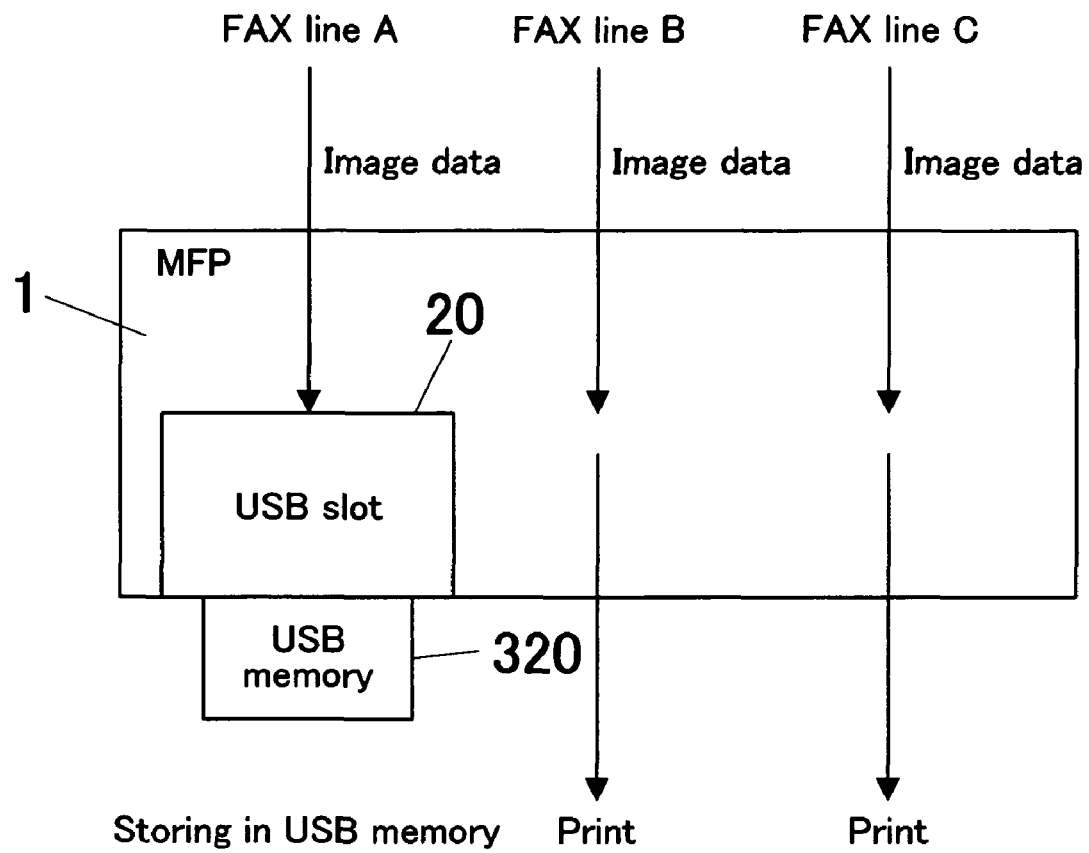
FIG. 7 is an explanatory view explaining the contents of FAX receiving processing.

FIG. 7 is an explanatory view for explaining processing of storing image data received by a predetermined line into a USB memory 320 in the MFP 1 shown in FIG. 1.

As explained above, this MFP 1 has a plurality of different FAX lines (FAX numbers) A, B and C in the FAX portion 302. The line specifying portion 311b of the control section 311 distinguishes which FAX line among lines A to C received the FAX. In this embodiment, in cases where it is distinguished that the FAX line which received an image is A, the control section 311 controls such that the USB memory 320 connected to the USB port 20 stores the image and the printing is not performed immediately.

In the storage portion 312, the relation between the FAX line A and the first USB port 20, or the correlated information showing the relation between the FAX line A and the USB memory 320 connected to the first USB port 20, is stored in advance.

The image data received by FAX lines B and C other than the FAX line A is controlled so as to be printed by the printer portion 14. In cases where the FAX line which received image data is A and the image data is stored in the USB memory 320, the fact is displayed on the job information screen area 208 of the display 12 by the display control portion 311e.

When a user inputs a pin number or the like into the setting screen area 207 with ten keys 202, the identification information detecting portion 311c detects the inputted pin number and the identification information of the USB memory 320, and the conformity thereof is discriminated by the judging portion 311d.

After confirming the conformity of the inputted pin number and the identification information of the USB memory 320, the printer portion 14 prints out the stored image data. Thus, it becomes possible only for a predetermined person to obtain the image data received by the FAX line A without being recognized by other persons.

In cases where the USB memory 320 is not connected to the first USB port 20, even if image data is received by the FAX line A, the printer portion 14 performs usual printing of the image data.

Figure 8:
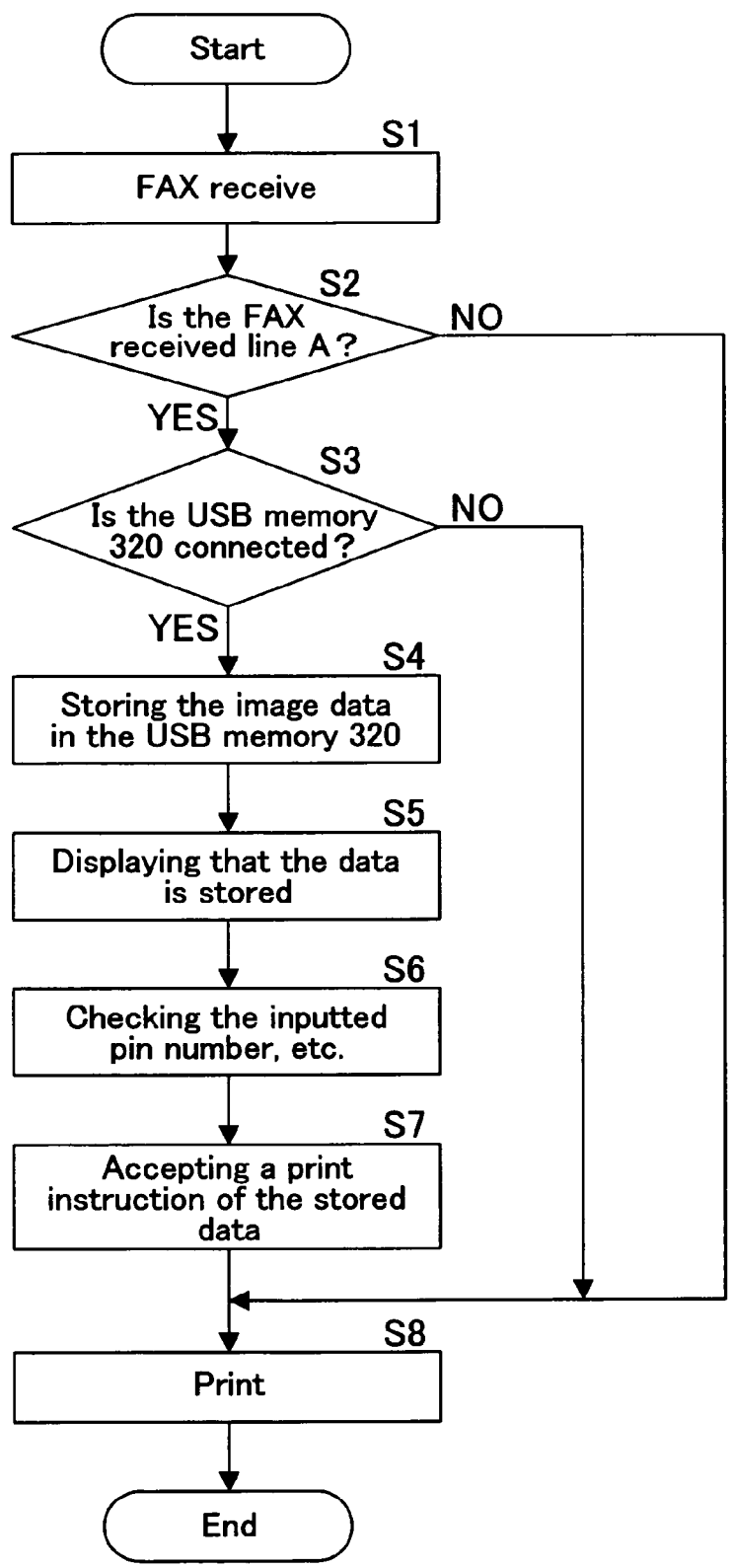
FIG. 8 is a flowchart showing the contents of the FAX receiving processing shown in FIG. 7.

FIG. 8 shows a flowchart of the aforementioned received-data storing processing performed by the control section 311. In the following explanation and drawings, a "Step" will be abbreviated as "S."

At S1, when the FAX portion 302 receives image data, the line specifying portion 311b discriminates the received FAX line at S2. In cases where the received FAX line is other than the FAX line A ("NO" at S2), the printer portion 14 prints out the image data, and the processing terminates.

In cases where the received FAX line is A ("YES" at S2), it is discriminated whether the USB memory 320 is connected to the first USB port 20 at S3.

In cases where the USB memory 320 is not connected to the first USB port 20 ("NO" at S3), the received image data is printed by the printer portion 14, and the processing terminates. In cases where the USB memory 320 is connected to the first USB port 20 ("YES" at S3), the received image data is stored in the USB memory 320 at S4, and the fact that the data is stored is displayed in the job information screen area 208 at S5.

When a user inputs a pin number or the like for printing image data stored in the USB memory 320 in the setting screen area 207 using the ten keys 202, the inputted pin number or the like and the identification information stored in the USB memory 320 are checked. If they conform, an instruction for printing the stored data from the user is accepted at S7, and then at S8, the instructed image data is printed by the printer portion 14, and the processing terminates.

Figure 9:
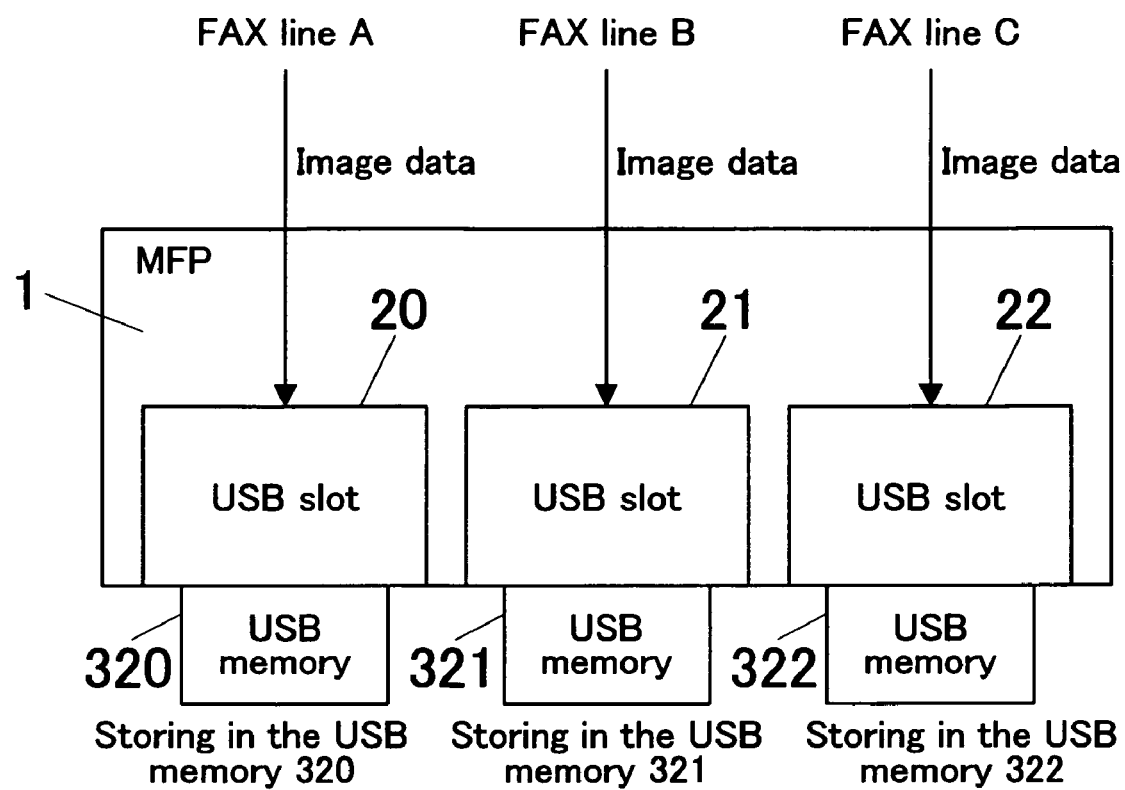
FIG. 9 is an explanatory view for explaining the contents of another FAX receiving processing.

FIG. 9 shows the case in which image data received via three FAX lines A to C are stored in corresponding three USB memories 320 to 322, respectively.

In the storage portion 312, the relation between the FAX lines A to C and the first to third USB ports 20 to 22, or the correlated information showing the relation between the FAX lines A to C and the USB memories 320 to 322 connected to the first to third USB ports 20 to 22, is stored in advance.

In this embodiment, the FAX line A and the USB memory 320 to be connected to the first USB port 20 is correlated, the FAX line B and the USB memory 321 to be connected to the first USB port 21 is correlated, and the FAX line C and the USB memory 322 to be connected to the first USB port 22 is correlated. Accordingly, the data received by the FAX line A is stored in the USB memory 320 connected to the first USB port 20, the data received by the FAX line B is stored in the USB memory 321 connected to the second USB port 21, and the data received by the FAX line C is stored in the USB memory 322 connected to the third USB port 22. In each case, it is controlled such that the received image data is not immediately printed by the printer portion 14.

When the image data is stored in any one USB memory, the fact is displayed in the job information screen area 208 of the display 12. When a user inputs the pin number of the corresponding USB memory in the setting screen area 207 with the ten keys 202 and it is confirmed that the pin number conforms the USB memory 320, the printer portion 14 prints out the stored image data. Thus, it becomes possible only for a specified person to obtain the image data received by each FAX line A to C without being recognized by other persons.

In cases where all of the USB memories 320 to 322 are not connected to the corresponding USB ports 20 to 22, the image data received by the line to which no USB memory is connected is normally printed by the printer portion 14.

Figure 10:
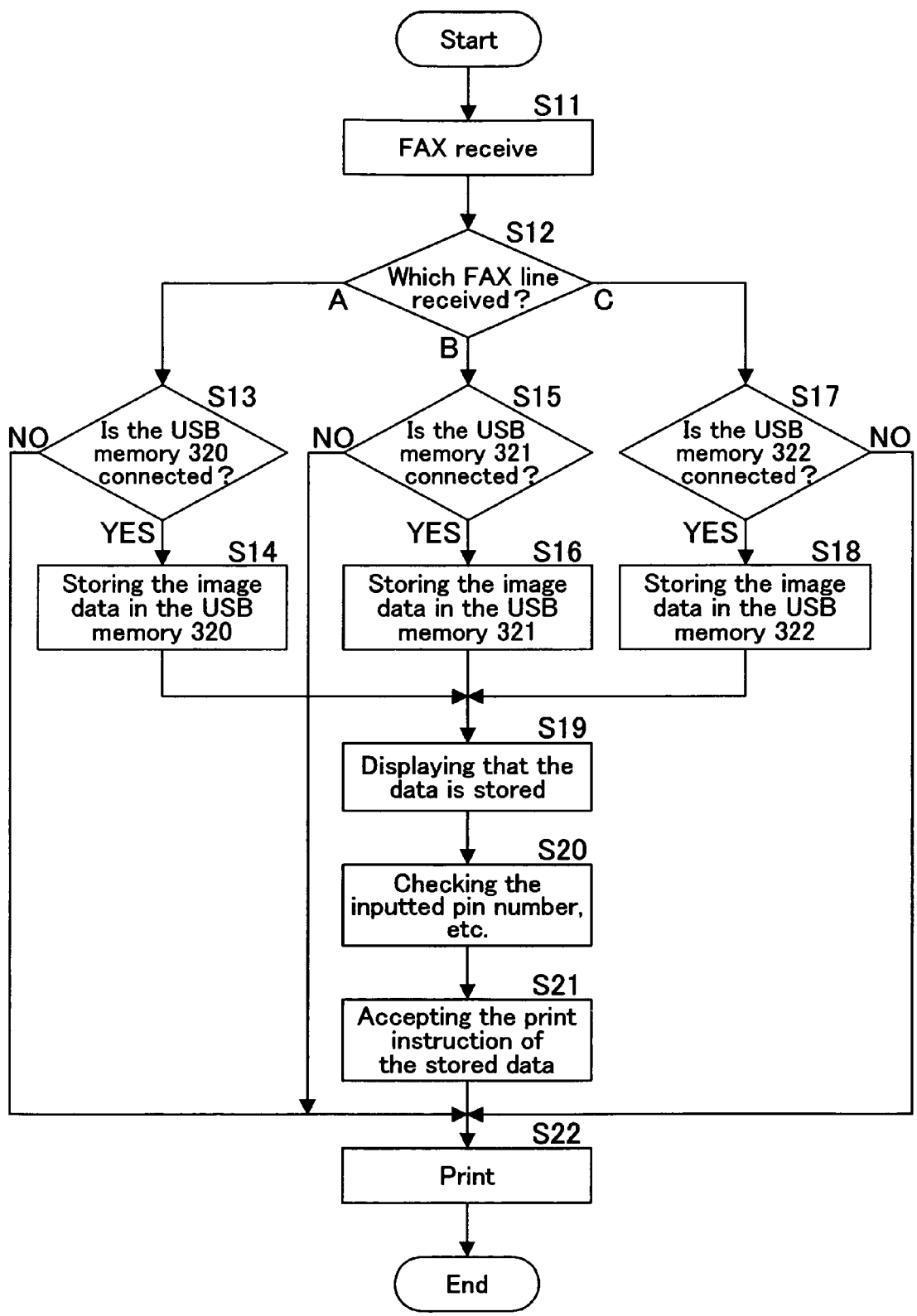
FIG. 10 is a flowchart showing the contents of the FAX receiving processing shown in FIG. 9.

FIG. 10 shows a flowchart of the received data storing processing shown in FIG. 9 and performed by the control section 311.

At S11, when the FAX portion 302 receives image data, the line specifying portion 311b discriminates the received FAX line at S12. In cases where the received FAX line is A ("A" at S12), the routine proceeds to S13, and it is discriminated whether the USB memory 320 is connected to the first USB port 20.

In cases where the USB memory 320 is not connected to the first USB port 20 ("NO" at S13), the received image data is printed out by the printer portion 14 at S22, and the processing terminates. In cases where the USB memory 320 is connected to the fist USB port 20 ("YES" at S13), the received image data is stored in the USB memory 320 at S14, and the routine proceeds to S19.

At S12, in cases where the received FAX line is B ("B" at S12), the routine proceeds to S15, and it is discriminated whether the USB memory 321 is connected to the second USB port 21.

In cases where the USB memory 321 is not connected to the second USB port 21 ("NO" at S15), the received image data is printed by the printer portion 14 at S22, and the processing terminates. In cases where the USB memory 321 is connected to the second USB port 21 ("YES" at S15), the received image data is stored in the USB memory 321 at S16, and the routine proceeds to S19.

At S12, in cases where the received FAX line is C ("C" at S12), the routine proceeds to S17, and it is discriminated whether the USB memory 322 is connected to the third USB port 22.

In cases where the USB memory 322 is not connected to the third USB port 22 ("NO" at S17), the received image data is printed by the printer portion 14 at S22, and the processing terminates. In cases where the USB memory 322 is connected to the third USB port 22 ("YES" at S17), the received image data is stored in the USB memory 322 at S18, and the routine proceeds to S19.

At S19, the fact that the received data is stored in the corresponding USB memory 320 to 322 is displayed in the job information screen area 208.

If a user inputs a pin number for printing image data stored in the USB memory 320 to 322 in the setting screen area 207 using the ten keys 202, the inputted pin number and the identification information stored in the USB memory 320 to 322 are checked at S20. If they conform, after receiving an instruction of printing of the stored data from the user at S21, the instructed image data is printed by the printer portion 14 at S22, and the processing terminates.

Figure 11:
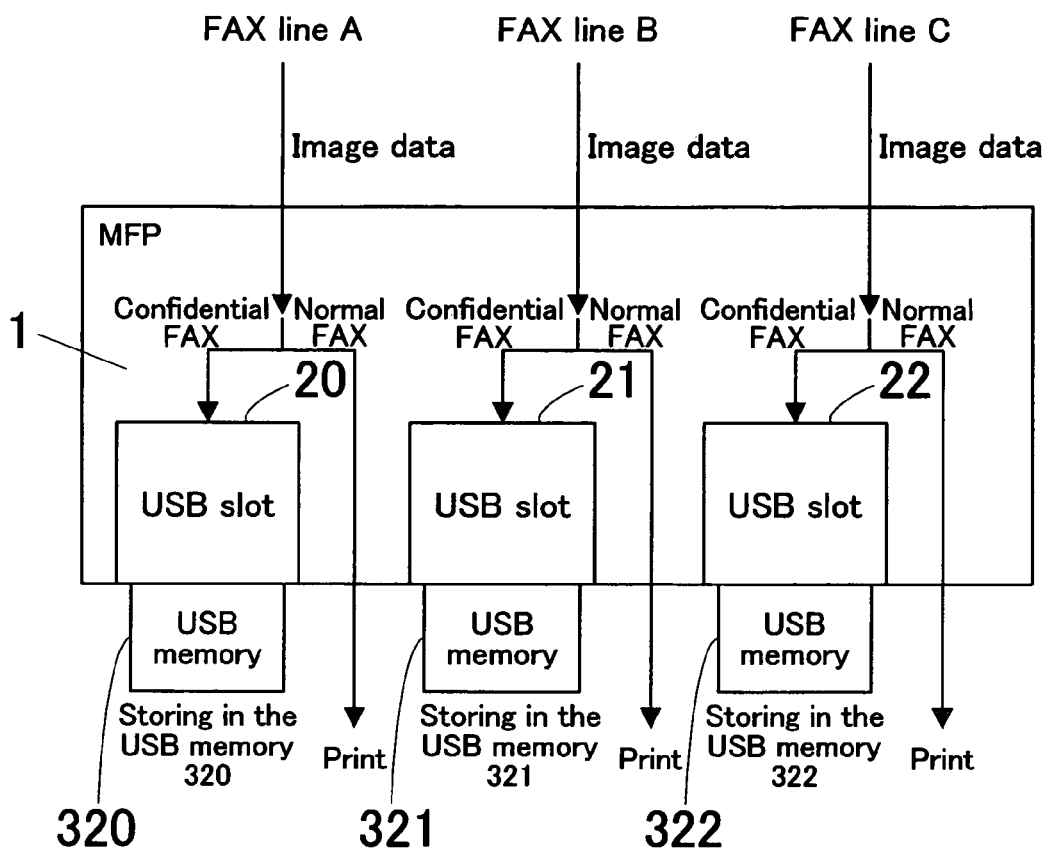
FIG. 11 is an explanatory view for explaining the contents of still another FAX receiving processing.

FIG. 11 shows the case in which confidential FAX data received via three FAX lines A to C is stored in corresponding three USB memories 320 to 322, respectively.

In the storage portion 312, the relation between each FAX line A to C and the first to third USB ports 20 to 22, or the correlated information showing the relation between the FAX lines A to C and the USB memories 320 to 322 to be connected to the first to third USB ports 20 to 22, is stored in advance.

In this embodiment, the FAX line A and the USB memory 320 connected to the first USB port 20 are correlated, the FAX line B and the USB memory 321 connected to the second USB port 21 are correlated, and the FAX line C and the USB memory 322 connected to the third USB port 22 are correlated.

Here, in cases where the received FAX line is A, it is discriminated whether it is a confidential FAX or a normal FAX. If it is discriminated as a confidential FAX, the pin number attached to the received image data is detected. And it is discriminated whether the detected pin number conforms with the identification information in the USB memory 320 connected to the first USB port 20 corresponding to the line A which received the confidential FAX. If they conform, the image data of the received confidential FAX is stored in the USB memory 320, and it is controlled such that the received image data is not immediately printed by the printer portion 14.

Also in cases where the received FAX line is B or C, the received confidential FAX image data is stored in corresponding USB memory 321 or 322.

In this way, even if the image data is received by any one of the FAX lines A to C, the image data distinguished as a confidential FAX will be stored in the corresponding USB memory 320 to 322, respectively.

When the image data of the confidential FAX is stored in corresponding USB memory, which FAX line A to C received the confidential FAX image data is displayed in the job information screen area 208 of the display 12. When a user inputs the corresponding identification information of the USB memory in the setting screen area 207 using the ten keys 202 and it is confirmed that the information conforms with the USB memory 320, the printer portion 14 prints the stored image data. Thus, it becomes possible only for a specified person to obtain the image data received by each FAX line A to C without being recognized by other persons.

In cases where a FAX line receives a confidential FAX in the state where no USB memory 320 to 322 is connected, it is displayed in the job information screen area 208 that which FAX line received confidential FAX image data and that no corresponding USB memory is connected. Accordingly, even in cases where corresponding USB memory 320 to 322 is not connected, the received image data will not be printed immediately.

Also in cases where it is not discriminated that the pin number detected from the confidential FAX and the identification information in the USB memory conform, it is displayed in the job information screen area 208 of the display 12 that which FAX line received the confidential FAX image data and that the identification information of the USB memory and the corresponding pin number of the confidential FAX do not conform. Thus, the received image data will not be printed immediately.

When it is discriminated that the received image data is not a confidential FAX but a normal FAX, even in cases where the image data is received by any FAX line, the received image data is printed by the printer portion 14.

Figure 12:
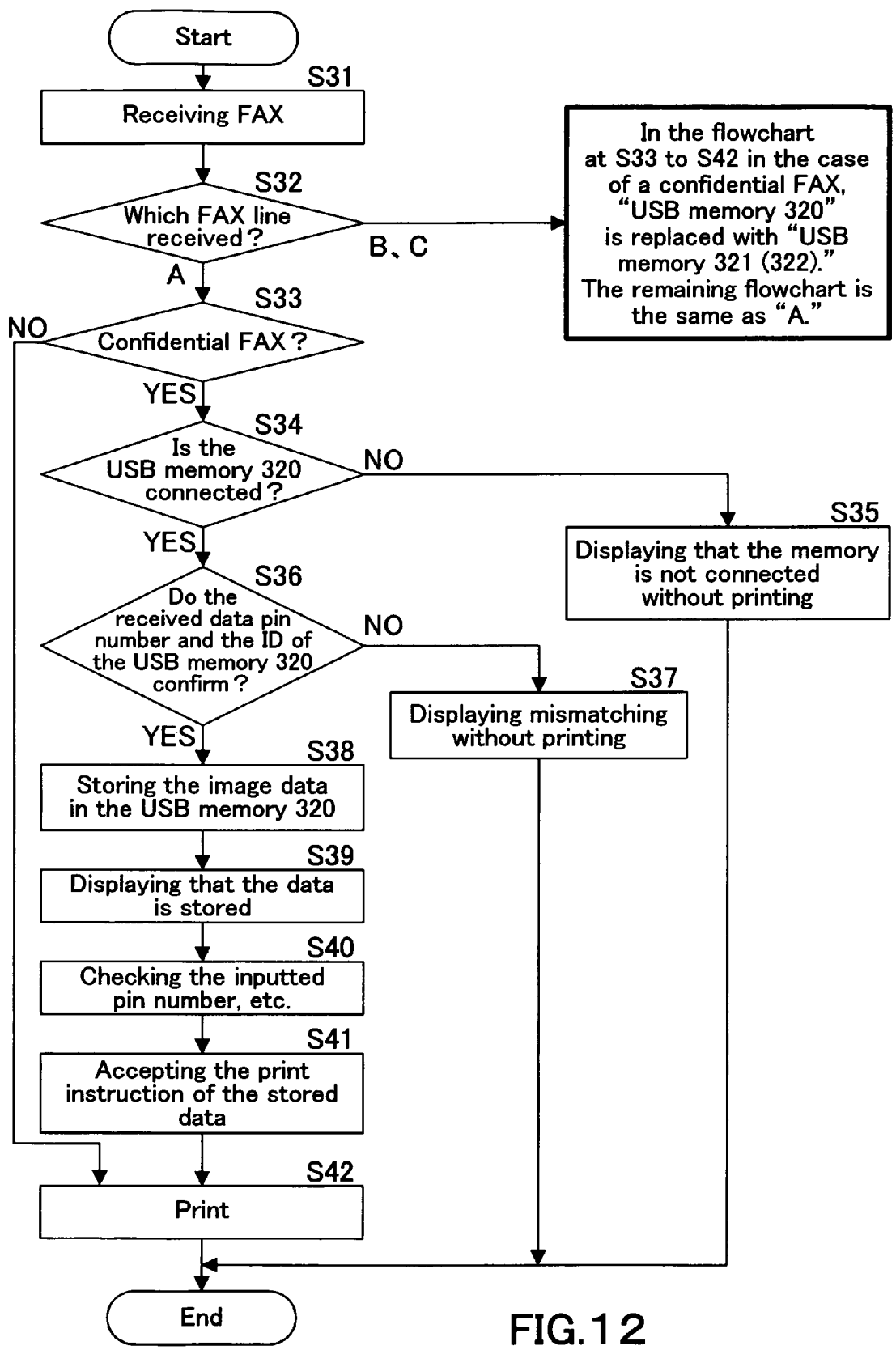
FIG. 12 is a flowchart showing contents of the FAX receiving processing shown in FIG. 11.

FIG. 12 shows a flowchart of the received data storing processing in the case of a confidential FAX shown in FIG. 11 which is performed by the control section 311.

At S31, when the FAX portion 302 receives image data, the line specifying portion 311b distinguishes the received FAX line at S32. If the received FAX line is A ("A" at S32), the routine proceeds to S33, and it is discriminated whether the received FAX is a confidential FAX or a normal FAX.

If it is discriminated that the received FAX is a normal FAX ("NO" at S33), the received image data is printed by the printer portion 14 at S42, and the processing terminates. If it is discriminated as a confidential FAX ("YES" at S33), the routine proceeds to S34, and it is discriminated whether the USB memory 320 is connected to the first USB port 20.

If the USB memory 320 is not connected to the first USB port 20 ("NO" at S34), without printing it, it is displayed in the job information screen area 208 of the display 12 that which line received the confidential FAX image data and that no corresponding USB memory is connected at S35. Then, the processing terminates.

In cases where the USB memory 320 is connected to the first USB port 20 ("YES" at S34), it is discriminated whether the pin number attached to the received data and the identification information (abbreviated as "ID" in figures) of the USB memory 320 conforms.

If it does not conform ("NO" at S36), without printing, at S37, it is displayed in the job information screen area 208 of the display 12 that the confidential FAX image data is received by which FAX line and that the corresponding identification information of the USB memory and the pin number of the confidential FAX do not conform. Then, the processing terminates.

In cases where the pin number attached to received data and the identification information of the USB memory 320 conform ("YES" at S36), at S38, the received image data is stored in the USB memory 320 and then it is displayed in the job information screen area 208 that the received data is stored in the USB memory 320 at S39.

When a user inputs a pin number for printing the image data stored in the USB memory 320 in the setting screen area 207 using the ten keys 202, the inputted pin number and the identification information stored in the USB memory 320 are checked at S40. It they conform, an instruction of printing of the stored data from a user is accepted at S41, and then the instructed image data is printed by the printer portion 14 at S42, and the processing terminates.

In cases where the received FAX line is B or C at S32 ("B" or "C" in S32), the processing is the same as the processing at S33 to S42 shown as the FAX line A except that the USB memory 320 should be substituted by the USB memory 321 or 322. Therefore, the detail explanation thereof will be omitted.

Although an embodiment of this invention was explained above, it should be noted that this invention is not limited to this embodiment. For example, in the above embodiment, the FAX lines A to C and the USB memories 320 to 322 are correlated by correlating the FAX lines A to C to the first to third memory ports 20 to 22. However, in place of the above, for example, it can be configured such that the FAX lines A to C and the USB memories 320 to 322 can be correlated by reading the line numbers corresponding to the FAX lines A to C stored in the USB memories 320 to 322.

In the aforementioned embodiment, although a USB memory is exemplified as an external storage 320 to 322, a portability hard disk drive unit, an optical disk or a memory card can be utilized as the external storage.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A facsimile apparatus, comprising:
a communication portion having a plurality of different facsimile lines corresponding to the facsimile apparatus, wherein each of the plurality of different facsimile lines is associated with a distinct facsimile number for the facsimile apparatus;
a connecting portion configured to connect an external storage, the connecting portion associated with a predetermined line of the plurality of different facsimile lines;
a line specifying portion configured to discriminate which of the plurality of different facsimile lines has received data;
a detecting portion configured to detect that the external storage is connected to the connecting portion;
a controller configured to automatically store data received by the predetermined line in the external storage connected to the connecting portion in response to a determination that the facsimile line discriminated by the line specifying portion is the predetermined line of the plurality of different facsimile lines that associated with the connecting portion and that a connection of the external storage to the connecting portion is detected by the detecting portion;
a first identification information detecting portion configured to detect first identification information inputted by a user;
a second identification information detecting portion configured to detect second identification information of the external storage storing the data received by the predetermined facsimile line; and
a discrimination portion configured to discriminate whether the first identification information and the second identification information conform,
wherein, in response to a determination that the first and second identification information conform by the discrimination portion, the controller is configured to output the data received by the predetermined facsimile line and stored in the external storage,
wherein the communication portion is configured to receive a confidential facsimile, and includes:
a third identification information detecting portion configured to detect third identification information attached to data of a received confidential facsimile,
wherein the discrimination portion is configured to discriminate conformity of the third and second identification information detected by the third and second identification information detecting portions, and
wherein the data received by the predetermined facsimile line includes the confidential facsimile and the controller is configured to store the data received by the predetermined facsimile line in the external storage only in response to a determination that the third and second identification information conform.

2. The facsimile apparatus as recited in claim 1, wherein the connecting portion, to which the external storage is connected for the automatic storing of the data received by the predetermined line, is a predetermined connecting portion among a plurality of connecting portions of the facsimile apparatus.

3. The facsimile apparatus as recited in claim 1, further comprising a display portion configured to display a determination that the third and second identification information do not conform.

4. The facsimile apparatus as recited in claim 1, wherein the controller is configured to automatically output data received by one of the plurality of different facsimile lines other than the predetermined line in response to a determination that the facsimile line discriminated by the line specifying portion is not the predetermined line.

5. The facsimile apparatus as recited in claim 1, wherein the controller is configured to automatically output data received by the predetermined facsimile line in response to a determination that the facsimile line discriminated by the line specifying portion is the predetermined line and that a connection of the external storage to the connecting portion is not detected by the detecting portion.

6. A received-data processing method for use in a facsimile apparatus, the method comprising:
discriminating which of a plurality of different facsimile lines corresponding to the facsimile apparatus has received data, wherein each of the plurality of different facsimile lines is associated with a distinct facsimile number for the facsimile apparatus;
detecting that an external storage is connected to a connecting portion of the facsimile apparatus, the connecting portion associated with a predetermined line of the plurality of different facsimile lines;
automatically storing data received by the predetermined line in the external storage in response to a determination that the discriminated facsimile line is the predetermined line of the plurality of different facsimile lines that associated with the connecting portion and that a connection of the external storage to the connecting portion is detected;
detecting first identification information inputted by a user;
detecting second identification information of the external storage storing the data received by the predetermined facsimile line;
discriminating whether the first identification information and the second identification information conform; and
outputting the data received by the predetermined facsimile line and stored in the external storage in response to a determination that the first and second identification information conform,
wherein the data received by the predetermined facsimile line is confidential facsimile data, and
wherein the processing method further comprises:
detecting third identification information attached to the received confidential facsimile data;
discriminating conformity of the detected third and second identification information, and
storing the data received by the predetermined facsimile line in the external storage only in response to a determination that the third and second identification information conform.

7. The received-data processing method for use in a facsimile apparatus as recited in claim 6, wherein the connecting portion, to which the external storage is connected for the automatic storing of the data received by the predetermined line, is a predetermined connecting portion among a plurality of connecting portions of the facsimile apparatus.

8. The received-data processing method as recited in claim 6, further comprising displaying a determination that the third and second identification information do not conform.

9. The received-data processing method for use in a facsimile apparatus as recited in claim 6 further comprising automatically outputting data received by one of the plurality of different facsimile lines other than the predetermined line in response to a determination that the discriminated facsimile line is not the predetermined line.

10. The received-data processing method for use in a facsimile apparatus as recited in claim 6 further comprising automatically outputting data received by the predetermined facsimile line in response to a determination that the discriminated facsimile line is the predetermined line and that a connection of the external storage to the connecting portion is not detected.

11. A facsimile apparatus, comprising:
a receiver which can receive data through a plurality of different facsimile lines corresponding to the facsimile apparatus, wherein each of the plurality of different facsimile lines is associated with a distinct facsimile number for the facsimile apparatus;
a connecting portion configured to connect an external storage, the connecting portion associated with a predetermined line of the plurality of different facsimile lines;
a line specifying portion configured to discriminate through which of the plurality of different facsimile lines data have been received;
a detecting portion configured to detect that the external storage is connected to the connecting portion;
a controller configured to automatically store data received through the predetermined line in the external storage connected to the connecting portion in response to a determination that the facsimile line discriminated by the line specifying portion is the predetermined line of the plurality of different facsimile lines that associated with the connecting portion and that a connection of the external storage to the connecting portion is detected by the detecting portion;
a first identification information detecting portion configured to detect first identification information inputted by a user;
a second identification information detecting portion configured to detect second identification information of the external storage storing the data received through the predetermined facsimile line; and
a discrimination portion configured to discriminate whether the first identification information and the second identification information conform,
wherein, in response to a determination that the first and second identification information conform by the discrimination portion, the controller is configured to output the data received through the predetermined facsimile line and stored in the external storage,
wherein the receiver is configured to receive a confidential facsimile, and includes:
a third identification information detecting portion configured to detect third identification information attached to data of a received confidential facsimile,
wherein the discrimination portion is configured to discriminate conformity of the third and second identification information detected by the third and second identification information detecting portions, and
wherein the data received through the predetermined facsimile line includes the confidential facsimile and the controller is configured to store the data received through the predetermined facsimile line in the external storage only in response to a determination that the third and second identification information conform.

12. A received-data processing method for use in a facsimile apparatus, the method comprising:
discriminating through which of a plurality of different facsimile lines corresponding to the facsimile apparatus data have been received, wherein each of the plurality of different facsimile lines is associated with a distinct facsimile number for the facsimile apparatus;
detecting that an external storage is connected to a connecting portion of the facsimile apparatus, the connecting portion associated with a predetermined line of the plurality of different facsimile lines;
automatically storing data received through the predetermined line in the external storage in response to a determination that the discriminated facsimile line is the predetermined line of the plurality of different facsimile lines that associated with the connecting portion and that a connection of the external storage to the connecting portion is detected;
detecting first identification information inputted by a user;
detecting second identification information of the external storage storing the data received through the predetermined facsimile line;
discriminating whether the first identification information and the second identification information conform; and
outputting the data received through the predetermined facsimile line and stored in the external storage in response to a determination that the first and second identification information conform, wherein the data received through the predetermined facsimile line is confidential facsimile data, and
wherein the processing method further comprises:
detecting third identification information attached to the received confidential facsimile data;
discriminating conformity of the detected third and second identification information, and
storing the data received through the predetermined facsimile line in the external storage only in response to a determination that the third and second identification information conform.

* * * * *